(12) United States Patent
Bou-Saada et al.

(10) Patent No.: US 10,554,117 B2
(45) Date of Patent: Feb. 4, 2020

(54) CONVERTOR FOR ELECTRIC FEEDER AND/OR SUBSTATION FOR RECUPERATING THE BRAKING ENERGY

(71) Applicant: ALSTOM TRANSPORT TECHNOLOGIES, Saint-Ouen (FR)

(72) Inventors: Johnny Bou-Saada, Rixensart (BE); Jérôme Sadoun, Braine l'Alleud (BE); Jonathan Scottini, Anderlecht (BE)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 326 days.

(21) Appl. No.: 14/995,231

(22) Filed: Jan. 14, 2016

(65) Prior Publication Data

US 2016/0211738 A1    Jul. 21, 2016

(30) Foreign Application Priority Data

Jan. 16, 2015  (FR) ..................... 15 50361

(51) Int. Cl.
*H02M 1/12*    (2006.01)
*B60M 3/06*    (2006.01)
(Continued)

(52) U.S. Cl.
CPC .............. *H02M 1/126* (2013.01); *B60M 3/06* (2013.01); *H02M 7/217* (2013.01); *H02M 7/797* (2013.01)

(58) Field of Classification Search
CPC .... H02M 1/126; H02M 7/217; H02M 7/2173; H02M 7/797; B60M 3/06
See application file for complete search history.

(56) References Cited

U.S. PATENT DOCUMENTS 7,804,198 B2 *   9/2010   Lowenstein .......... H02M 1/126
                                                              307/105
7,965,056 B2 *   6/2011   Terunuma ................. B60L 7/16
                                                              318/800
(Continued)

FOREIGN PATENT DOCUMENTS

BR    200502862 A1    8/2005
BR    200801864 A1    9/2008
(Continued)

OTHER PUBLICATIONS

Preliminary Search Report dated Nov. 26, 2015 in related French Patent Application No. 15 50361.
(Continued)

*Primary Examiner* — Zachary L Kuhfuss
(74) *Attorney, Agent, or Firm* — Eric L. Lane; Green Patent Law

(57) ABSTRACT

The invention relates to an electric converter (30) for a substation feeding an electric grid and/or for recuperating the braking energy of rail vehicles traveling on a railroad track, the substation being connected to a feeder line able to supply a DC voltage to the rail vehicles traveling on the railroad track, the substation comprising an electricity distribution grid able to deliver a corresponding three-phase voltage with three phases, the converter (30) comprising a transformer (306) able to inspect the value of the three-phase voltage delivered by the electricity distribution grid, a filtering device (304) able to filter the three-phase voltage of the transformer (306), and an inverter (302) connected to the filter (304).

14 Claims, 3 Drawing Sheets

Figure 1:
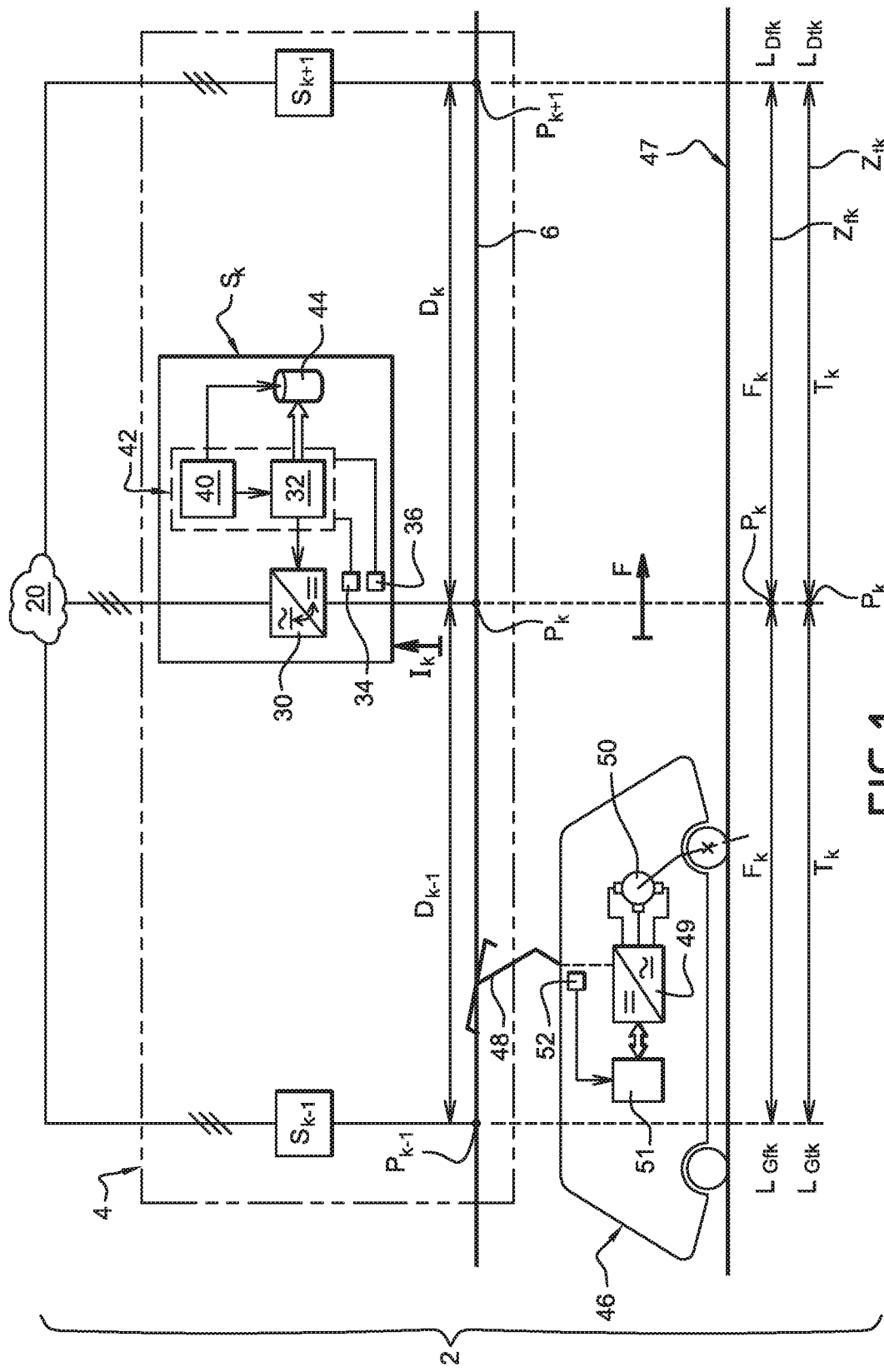

(51) Int. Cl.
*H02M 7/217* (2006.01)
*H02M 7/797* (2006.01)

(56) References Cited

U.S. PATENT DOCUMENTS

| | | | | |
|---|---|---|---|---|
| 8,146,513 | B2* | 4/2012 | Ibaiondo Madariaga | ................... B60M 3/06 104/289 |
| 8,550,007 | B2* | 10/2013 | Mazumdar | ................ B60L 7/10 104/289 |
| 8,550,008 | B2* | 10/2013 | Mazumdar | ................ B60L 7/10 104/289 |
| 8,817,508 | B2* | 8/2014 | Park | ................ H02M 7/797 363/95 |
| 8,963,456 | B2* | 2/2015 | Sugiura | ................ B60L 7/16 307/10.1 |
| 9,038,794 | B2* | 5/2015 | Cornic | ................ B60L 9/00 191/4 |
| 9,065,321 | B2* | 6/2015 | Divan | ................ H02M 1/00 |
| 9,221,346 | B2* | 12/2015 | Kitanaka | ................ B60L 7/16 |
| 9,308,923 | B2* | 4/2016 | Matsumura | ................ B60M 3/06 |
| 2012/0229055 | A1* | 9/2012 | Sugiura | ................ B60L 7/16 318/139 |
| 2013/0076151 | A1* | 3/2013 | Bae | ................ H02M 1/126 307/82 |
| 2014/0182991 | A1* | 7/2014 | Cornic | ................ B60L 9/00 191/4 |
| 2015/0085552 | A1* | 3/2015 | Inomata | ................ H02M 5/297 363/163 |
| 2015/0097507 | A1* | 4/2015 | Kim | ................ H02M 3/1582 318/504 |
| 2015/0130432 | A1* | 5/2015 | Yamazaki | ................ H02M 5/297 323/272 |
| 2015/0333642 | A1* | 11/2015 | Son | ................ H02M 5/44 363/35 |
| 2016/0144871 | A1* | 5/2016 | Jalla | ................ B60L 1/003 105/27 |
| 2016/0159250 | A1* | 6/2016 | Meng | ................ B60M 3/06 191/2 |
| 2016/0352252 | A1* | 12/2016 | Yu | ................ H02M 7/537 |
| 2016/0365806 | A1* | 12/2016 | Ichihara | ................ H02M 7/125 |

FOREIGN PATENT DOCUMENTS

| | | | | |
|---|---|---|---|---|
| CN | 101353020 | A | 1/2009 | |
| CN | 101376344 | A | 3/2009 | |
| CN | 102684514 | A | 9/2012 | |
| EP | 1350666 | A1 | 10/2003 | |
| EP | 1619 069 | A1 | 1/2006 | |
| EP | 1985490 | A1 | 10/2008 | |
| EP | 2582032 | A2 | 4/2013 | |
| EP | 2749447 | A1 | 7/2014 | |
| EP | 2749447 | A1 * | 7/2014 | ............... B60L 9/00 |
| EP | 3032728 | A1 * | 6/2016 | ............... B60M 3/06 |
| EP | 3032728 | A1 | 6/2016 | |
| EP | 3045343 | A1 * | 7/2016 | ........... H02M 7/217 |
| EP | 3045343 | A1 | 7/2016 | |
| EP | 3075596 | A1 | 10/2016 | |
| EP | 3150419 | A1 * | 4/2017 | ............... B60L 7/18 |
| EP | 3150419 | A1 | 4/2017 | |
| EP | 3075596 | A4 * | 6/2017 | |
| FR | 2915435 | A1 * | 10/2008 | ............... B60L 7/10 |
| FR | 2915435 | A1 | 10/2008 | |
| FR | 3000443 | A1 * | 7/2014 | ............... B60L 9/00 |
| FR | 3000443 | A1 | 7/2014 | |
| FR | 3031849 | A1 * | 7/2016 | ........... H02M 7/217 |
| FR | 3031849 | A1 | 7/2016 | |

OTHER PUBLICATIONS

Search Report in related European Patent Application No. 16 15 0818.

Arnold Rodewald, Elektromagnetische Vertraglichkeit, 1995.

* cited by examiner

CONVERTOR FOR ELECTRIC FEEDER AND/OR SUBSTATION FOR RECUPERATING THE BRAKING ENERGY

FIELD OF THE INVENTION

This patent application claims the benefit of the document FR 15/50361 filed on Jan. 16, 2015 which is hereby incorporated by reference.

The present invention relates to a convertor for a feeder substation of the electric grid and/or for recuperating the braking energy of rail vehicles. The invention also relates to a substation equipped with such a convertor. The invention also relates to a system for recuperating braking energy including such substations.

BACKGROUND OF THE INVENTION

Railroad substations that deliver a DC voltage on the catenaries generally include a diode bridge. Such a diode bridge includes six diodes for rectifying three phases and twelve diodes for rectifying six phases.

Due to their simplicity, such substations are considered to be the only alternative to create DC voltage to power the trains.

However, such substations do not make it possible to recuperate the braking energy produced during a deceleration of a train, since the trains are generally equipped with a high-performance system for recuperating kinetic energy. Such substations also do not make it possible to correct the $\cos(\varphi)$ at the input of the substation and generate many harmonics on the AC grid at the input of the substation and on the DC grid at the output of the substation.

In order to resolve the aforementioned drawback, it is known to recuperate the braking energy of the rail vehicle using a thyristor rectifier. The rectifier is able to regulate the DC output voltage. The DC voltage is the rectified voltage. The recuperation is done via an inverter that recuperates the excess energy from the DC grid. The inverter sends such an excess back to the three-phase grid. In such a case, the inverter is provided with its own transformer.

However, such substations do not make it possible to keep the delivered voltage level at an acceptable value in vacuum and under a load.

Furthermore, such substations are generally a significant source of pollution for the AC grid.

SUMMARY OF THE INVENTION

There is therefore a need for a substation providing good efficiency of the electric grid with low pollution.

To that end, proposed is an electric converter for a substation feeding an electric grid and/or for recuperating the braking energy of rail vehicles traveling on a railroad track, the substation being connected to a feeder line able to supply a DC voltage to the rail vehicles traveling on the railroad track, the substation comprising an electricity distribution grid able to deliver a corresponding three-phase voltage with three phases, the converter comprising a transformer able to inspect the value of the three-phase voltage delivered by the electricity distribution grid, a filtering device able to filter the three-phase voltage of the transformer, and an inverter connected to the filter.

According to specific embodiments, the converter comprises one or more of the following features, considered alone or according to any technically possible combinations:

for each generated phase, the inverter includes two assemblies in series, each assembly including a diode and a transistor in parallel.
each transistor is an insulated gate bipolar transistor.
the filtering device is an LC circuit.
the transformer includes each of the dipoles able to generate an inductance of the filtering device.
the filtering device is a filter reducing the current harmonics that may be reinjected on the electricity distribution grid.

Furthermore, proposed is a substation for feeding a grid and/or recuperating braking energy from rail vehicles traveling on a railroad track, the substation being connected to a feeder line able to supply a DC voltage to the rail vehicles traveling on the railroad track, the substation comprising an electricity distribution grid able to deliver a corresponding three-phase voltage with three phases, and a single converter as previously described.

Also proposed is a system for feeding a grid and/or for recuperating the braking energy from rail vehicles, the system including a plurality of substations as previously described.

Also proposed is a system for feeding a grid and/or for recuperating the braking energy from rail vehicles, the system including at least one feeder line extending along a railroad track to supply the rail vehicles traveling on the railroad track. The plurality of substations are spaced apart from one another by a distance exceeding 100 meters, each substation being electrically connected to the feeder line at a connecting point and equipped with a sensor or an estimator of a voltage $U_{ssk}$ at the connecting point, and a control module of the converter able to automatically switch the converter into a regeneration mode in which the converter continuously transfers electricity from the feeder line to the electricity distribution grid to recuperate the braking energy from the rail vehicles, once the measured or estimated voltage $U_{ssk}$ is above a threshold $U_{C3k}$, such that each substation is associated with its own braking energy recuperation zone $Z_{fk}$ in which, irrespective of the position of the rail vehicle within that zone $Z_{fk}$, the substation $S_k$ is capable of recuperating at least part of the braking energy of that rail vehicle, a braking energy recuperation zone $Z_{fk}$ being a segment of the feeder line centered around the point $P_k$ and the boundaries of which are spaced apart on either side of the point $P_k$ by a distance $F_k$ equal to $(U_{Cmax} - U_{C3mink})/(\rho I_{max})$ where $U_{Cmax}$ is a maximum nonpermanent admissible voltage on the feeder line, $U_{C3mink}$ is the minimum value that can be assumed by the threshold $U_{C3k}$ during the operation of the substation, $\rho$ is the linear resistance of the feeder line, and $I_{max}$ is the maximum admissible intensity for the current circulating on the feeder line. The value of the limit $U_{C3mink}$ is such that the distance $F_k$ is greater than or equal to $D_k/2$.

According to specific embodiments, the system comprises one or more of the following features, considered alone or according to any technically possible combinations: the substations ($S_k$) are equidistant from one another.

the value of the limit $U_{C3mink}$ is such that the distance $F_k$ is greater than or equal to the distance $D_k$.
the electric converter is able to transfer the electricity from the electricity distribution grid to the feeder line to supply traction to the rail vehicle(s), such that the substation $S_k$ is also associated with a zone $Z_{tk}$ for supplying traction of the rail vehicles in which, irrespective of the position of the rail vehicle within the zone $Z_{tk}$, the substation $S_k$ is capable of feeding the electric traction motors of the rail vehicle, a traction feeder zone $Z_{tk}$ being a segment $[L_{Gtk}; L_{Dtk}]$ of the feeder line centered around the point $P_k$ and the limits $L_{Gtk}$, $L_{Dtk}$ of which are spaced apart on either side of the point $P_k$ by a distance $T_k$ equal to $(U_{ssmaxk} - U_{Cmin})/(\rho I_{max})$, where:

$U_{ssmaxk}$ is the maximum voltage that can be generated by the electric converter of the substation $S_k$ at the point $P_k$ to supply traction to a rail vehicle, $U_{Cmin}$ is the minimum nonpermanent admissible voltage on the feeder line, the value of the bound $U_{ssmaxk}$ being such that the distance $T_k$ is greater than or equal to $D_k/2$ or $D_k$.

the control module is able to automatically switch the electric converter into a traction supply mode in which the electric converter continuously transfers electricity from the electricity distribution grid to the feeder line when the measured or estimated voltage $U_{ssk}$ k is below a threshold $U_{dk}$.

the limit $U_{C3mink}$ is strictly below the threshold $U_{dk}$.

when the measured or estimated voltage $U_{ssk}$ is comprised between the bound $U_{C3mink}$ and the threshold $U_{dk}$, the control module is able to switch the electric converter either into the regeneration mode or into the traction supply mode depending on the mode in which the converter was found before the voltage $U_{ssk}$ was comprised between the limit $U_{C3mink}$ and the threshold $U_{dk}$.

the substation $S_k$ includes a module for adjusting the value of the threshold $U_{C3k}$ able to vary the value of the threshold from the lower bound $U_{C3mink}$ to an upper bound $U_{C3maxk}$ greater than or equal to 90% of a maximum voltage $U_{Cmax}$ authorized on the feeder line, this adjustment module being able to keep the value of the threshold $U_{C3k}$ strictly greater than the measured or estimated voltage $U_{ssk}$ as long as the increase of the measured or estimated voltage $U_{ssk}$ remains below a predetermined threshold $a_{ssk}$.

when the intensity of the current crossing through the electric converter is null, the adjusting module is able to decrease the value of the threshold $U_{C3k}$ to the limit $U_{C3mink}$ if the increase in the voltage $U_{ssk}$ is greater than or equal to the predetermined threshold $a_{ssk}$.

the control module is able to command the electric converter so that the electric converter transfers the greatest possible quantity of electricity per unit of time from the feeder line to the electricity distribution grid, once the measured or estimated voltage $U_{ssk}$ exceeds a threshold $U_{cmax2k}$ greater than or equal to the limit $U_{C3maxk}$.

the electric converter is a controlled converter with at least two quadrants made using thyristors or power transistors, the control module being able to command the converter to keep the voltage $U_{ssk}$ constant as long as the electric power generated on the feeder line or absorbed from the feeder line does not vary by more than 50%.

DETAILED DESCRIPTION OF THE DRAWINGS

Figure 2:
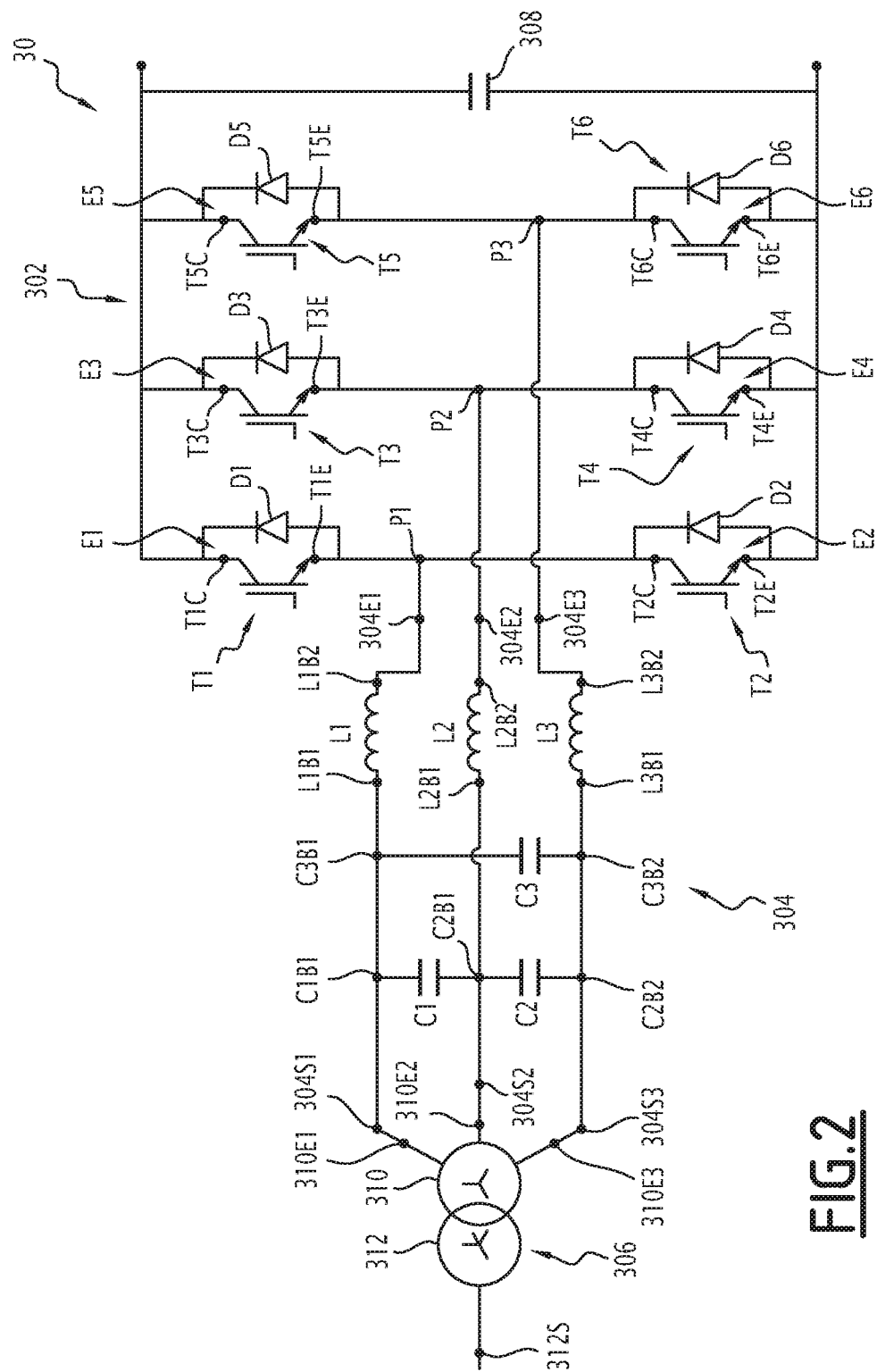
Figure 3:
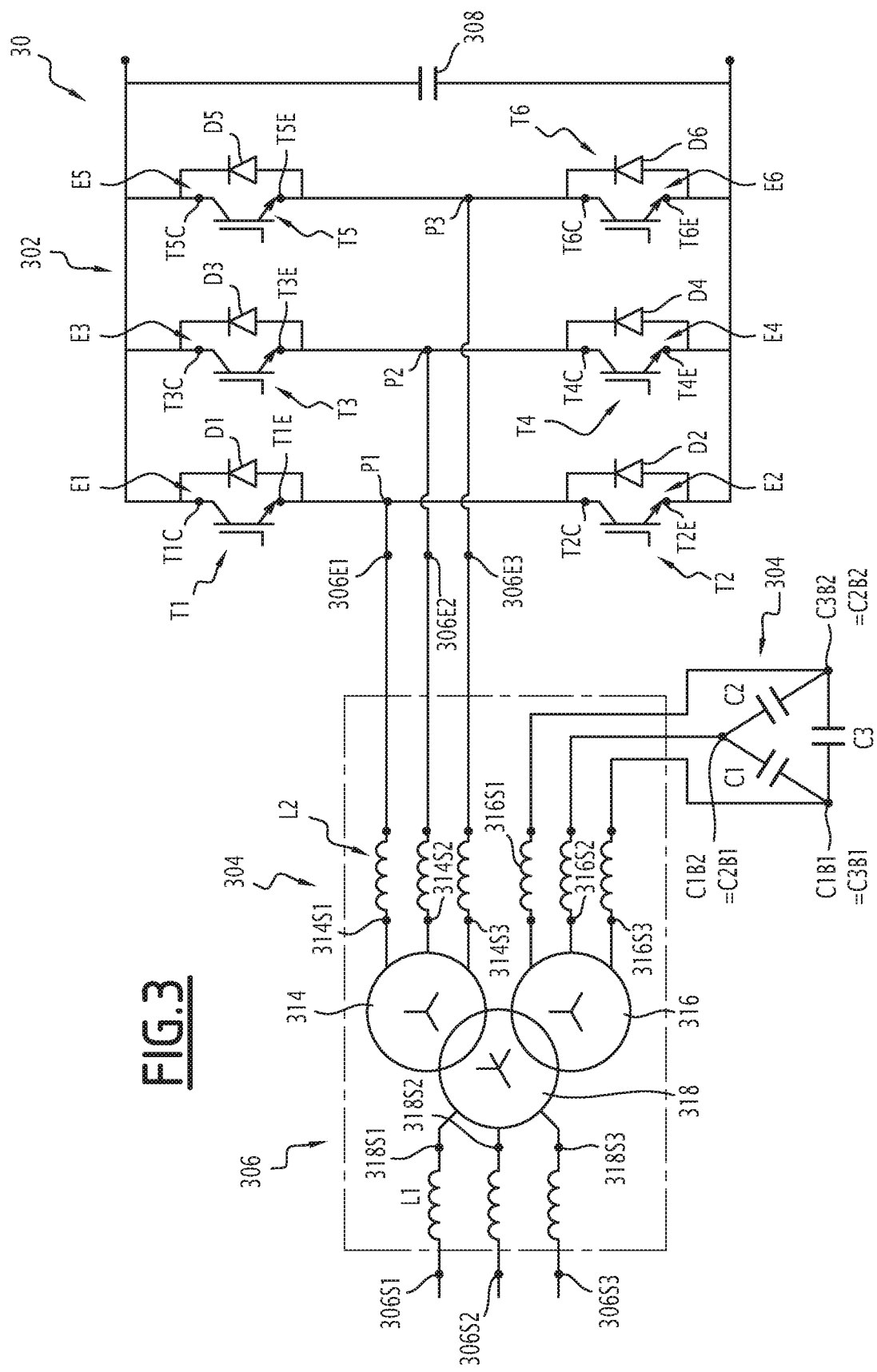

Other features and advantages of the invention will appear upon reading the following description of embodiments of the invention, provided as an example only and in reference to the drawings, which are:

FIG. 1, a diagrammatic illustration of the architecture of a railroad network equipped with a system of reversible substations for recuperating braking energy, FIG. 2, a view of a recuperation substation converter according to the invention, and FIG. 3, a view of another recuperation substation converter according to the invention.

In these figures, the same references are used to designate the same elements.

DETAILED DESCRIPTION OF THE PREFERRED EMBODIMENTS

FIG. 1 shows a railroad network 2 equipped with a system 4 for recuperating braking energy.

The system 4 comprises one or more feeder lines and many substations distributed at regular intervals along these feeder lines. In order to simplify FIG. 1, only one feeder line 6 and three substations $S_{k-1}$, $S_k$ and $Sk_{+1}$ have been shown.

The feeder line is able to supply a DC voltage to the rail vehicles traveling on the railroad track.

The expression "feeder line" refers both to an overhead catenary wire on which a pantograph of a rail vehicle rubs to be supplied with electricity, and a third rail positioned along the rails of the railroad tracks. In the case of a third rail, the pantograph is better known as "collector shoe".

The index k represents the order number of each substation starting from a substation $S_0$ situated at one end of the feeder line 6 and moving in the direction as indicated in FIG. 1.

The voltage on the feeder line 6 can vary between a nonpermanent maximum voltage $U_{Cmax}$ and a nonpermanent minimum voltage $U_{Cmin}$. These maximum and minimum limits are typically defined by standards such as European standard EN 50 163 or CEI 60850. For example, here, the limit $U_{Cmax}$ is equal to 1000 Vdc and the limit UCmin is equal to 500 Vdc for a feeder line whose nominal voltage $U_{Cnom}$ is equal to 750 Vdc.

Each substation $S_k$ is electrically connected to the feeder line 6 at a connecting point $P_k$. The point $P_k$ is separated from the point $P_k+1$ by a distance $D_k$ and from the point $P_k-1$ by a distance $D_k-1$. The distance $D_k$ is also known as the inter-station distance. Preferably, the distance $D_k$ is the same for all of the indexes k, such that each of the substations is equidistant from the others.

The inter-station distance $D_k$ is greater than several hundred meters. The distance $D_k$ is also short enough so that the substation $S_k$ can supply traction to a rail vehicle whose pantograph is situated at the point $P_k+1$. Here, the distance $D_k$ is comprised between 1000 m and 2000 m for a nominal voltage of 750 Vdc and can go up to 20 km for a nominal voltage of 3000 Vdc.

Here, supplying traction refers to the fact the substation generates, on the feeder line 6, enough power to feed the traction motors of the rail vehicle and therefore to allow that rail vehicle to move under the voltage conditions set out above.

Each substation $S_k$ is associated with a traction supply zone $Z_{tk}$. The zone $Z_{tk}$ is a segment $[L_{Gtk}; L_{Dtk}]$ of the feeder line 6 centered around the point $P_k$. The left and right bounds $L_{Gtk}$ and $L_{Dtk}$ are spaced apart from the point $P_k$ by a distance $T_k$. The distance $T_k$ is defined by the following relationship:

$$T_k = \frac{U_{ss\ max\ k} - U_{Cmin}}{\rho \cdot I_{max}}$$

Where:

$U_{ss\ max\ k}$ is the maximum traction voltage that can be generated by the substation $S_k$ at the point $P_k$ to supply traction to a rail vehicle, $U_{Cmin}$ is the minimum non-temporary allowable voltage on the feeder line 6, ρ is the linear resistance of the feeder line 6 and its feeders, and $I_{max}$ is the maximum allowable intensity for the current circulating in the feeder line 6.

Linear resistance here refers to the value of the resistance per unit of length.

The zone $Z_{tk}$ therefore corresponds to the segment of the feeder line 6 in which, irrespective of the position of the rail vehicle within that zone, the substation $S_k$ is able to supply traction to the rail vehicle. Beyond the bounds $L_{Gtk}$ and $L_{Dtk}$, the voltage drop due to the linear resistance of the feeder line 6 is such that even if the substation $S_k$ generates the voltage $U_{SS\ max\ k}$ at the point $P_k$, the voltage of the pantograph of the rail vehicle can be below the voltage $U_{Cmin}$. The rail vehicles therefore cannot be systematically supplied with traction past these bounds $L_{Gtk}$ and $L_{Dtk}$ by the substation $S_k$.

As an illustration, $U_{SS\ max\ k}$ is greater than or equal to $U_{Cnom}$. These choices are made during the design of the network 2, and therefore impose the distance $T_k$. Next, the distance $D_k$ is chosen to be equal to or slightly smaller than the distance $T_k$, such that irrespective of the position of the rail vehicle along the feeder line 6, the latter is always simultaneously in two zones $Z_{tk}$ and $Z_{tk+i}$. Such a choice of the distance $D_k$ makes it possible to guarantee that the rail vehicle can be fed irrespective of its position along the feeder line 6, even in case of failure of one of the substations $S_k$.

The substation $S_k$ is also associated with a braking energy recuperation zone $Z_{fk}$. This zone $Z_{fk}$ is a segment $[L_{Gfk}; L_{Dfk}]$ of the feeder line 6 centered around the point $P_k$. The bounds $L_{Gfk}$ and $L_{Dfk}$ are spaced away from the point $P_k$ by a distance $F_k$. The distance $F_k$ is defined by the following relationship:

$$F_k = \frac{U_{Cmax} - U_{C3\ min\ k}}{\rho \cdot I_{max}}$$

Where:

$U_{Cmax}$ is the maximum non-permanent allowable voltage on the feeder line 6, $U_{C3min\ k}$ is a lower bound for the value of a threshold $U_{C3k}$ that will be defined later.

Here, $U_{C3mink}$ is chosen to be less than or equal to $U_{Cnomk}$. Thus, the distance $F_k$ is greater than or equal to the distance $D_k$.

For example, the bound $U_{C3min\ k}$ is chosen to be equal to 700 Vdc.

The zone $Z_{fk}$ is a zone in which, irrespective of the position of the rail vehicle braking within that zone $Z_{fk}$, the substation $S_k$ can recuperate all or part of the braking energy of that rail vehicle.

Given that the distance $F_k$ is greater than or equal to the distance $D_k$, it is therefore possible to recuperate the braking energy of a rail vehicle either at the point $P_k-1$, or at the point $P_k+1$. Thus, even if the substation $S_k$ is out of service, the substations $S_k-1$ and $S_k+1$ make it possible to recuperate the braking energy of the railway vehicle, irrespective of the position of the railway vehicle between the points $P_k-1$ and $P_k+1$. It is therefore possible to guarantee that all of the braking energy of the railway vehicle will be recovered, even if the substation is out of service.

All of the substations $S_k$ are connected to a same long-distance electricity distribution grid 20. Here, the grid 20 is a three-phase AC voltage grid with a voltage in category A or B. An AC high voltage in category A or B here refers to an AC voltage comprised between 1000 and 50,000 Vac. According to the teaching of patent application FR 2,873,332, this grid 20 can also be a three-phase alternating low-voltage grid. Here, three-phase alternating low voltage refers to a voltage below 1000 Vac. Typically, this three-phase alternating low-voltage grid will then be a low-voltage grid in category B or BTB, i.e., whereof the AC voltage is comprised between 500 and 1000 Vac.

Here, all of the substations $S_k$ are identical to one another, and only substation $S_k$ is shown in detail in FIG. 1.

The substation $S_k$ includes a four-quadrant converter 30 connected on the one hand to the grid 20 and on the other hand to the point $P_k$ on the feeder line 6.

This converter 30 is capable of rectifying the three-phase voltage of the grid 20 to deliver, on the feeder line 6, a rectified DC voltage comprised between $U_{ssmaxk}$ and $U_{Cmin}$. The converter 30 is also capable of inverting the DC voltage present on the feeder line 6 to deliver, on the grid 20, a three-phase voltage built from that DC voltage comprised between $U_{C3mink}$ and $U_{Cmax}$. The two-way converter 30 operating both as rectifier and inverter.

The different components of the converter 30 are more precisely described in reference to FIGS. 2 and 3 below.

The converter 30 is a controllable converter. To that end, the substation $S_k$ includes a control unit 32 capable of controlling the converter 30 to cause it to operate as a rectifier, and, alternatively, as an inverter. The unit 32 also makes it possible to enslave the voltage $U_{ssk}$ delivered or absorbed at the point $P_k$ to a set point $U_{ssc}$. To that end, the substation $S_k$ includes a sensor 34 for the intensity of the current $I_k$ and a sensor 36 for the voltage $U_{ssk}$ at the point $P_k$.

More specifically, the unit 32 is capable of switching the converter 30 to a regeneration or electricity recuperation mode once the measured voltage $U_{ssk}$ is above a threshold $U_{C3k}$. The unit 32 is also capable of automatically switching the converter 30 into traction supply mode once the voltage $U_{ssk}$ is below a threshold $U_{dk}$. For example, the threshold $U_{dk}$ is less than or equal to $U_{Cnom}$.

The substation $S_k$ also includes a module 40 for adjusting the value of the threshold $U_{C3k}$ as a function of the measured voltage $U_{ssk}$.

The unit 32 and the module 40 are for example made from a programmable computer 42 able to execute instructions recorded in a memory 44 connected to the computer. To that end, the memory 44 here includes instructions for the execution of the method of FIG. 2 as well as the different values of the thresholds and bounds used here.

The system 2 also comprises a rail vehicle 46 traveling on a railroad track 47. This vehicle 46 is electrically connected to the feeder line 6 by a pantograph 48. The pantograph 48 makes it possible to capture electricity from the feeder line 6 and deliver it to the input of an electric converter 49 on board the vehicle 46. The converter 49 is able to convert the direct voltage obtained via the pantograph 48 into a three-phase feeder voltage for a traction motor 50. The motor 50 is for example a synchronous or asynchronous electric motor. This motor 50 is able to rotate the wheels of the vehicle 46. The motor 50 is also able to operate as a generator to brake the vehicle 46. In that case, the converter 49 is able to operate as rectifier to return the braking energy to the feeder line 6.

The converter 49 is a converter controllable by the control unit 51. This control unit 51 is able to protect the converter 49 as a function of a voltage $U_T$ measured at the pantograph 48 via a sensor 52. To that end, the unit 51 is able to trigger the electric isolation of the electric vehicle 46 from the feeder line 6 as a function of the measured voltage $U_T$.

The vehicle 46 has no braking resistance or rheostat on board able to dissipate, in the form of heat, all of the braking energy produced by the motor 50 when the latter works as a generator.

According to the example of FIG. 2, a particular converter 30 is proposed.

As before, the converter 30 is inserted between the distribution grid 20 and the feeder line 6.

The converter 30 includes an inverter 302, a filtering device 304 and a transformer 306.

The inverter 302 is a DC-AC converter.

The inverter 302 is connected to the feeder line 6, delivering a voltage of 750 V.

From this DC supply, according to the example of FIG. 2, the first inverter 302 is able to deliver three phases P1, P2 and P3 of a three-phase alternating current to the filtering device 304. These three phases P1, P2 and P3 are created by using, for each phase, two transistor-diode assemblies E1, E2, E3, E4, E5 and E6 placed in series and subjected to the DC potential. Each of the transistor-diode assemblies E1, E2, E3, E4, E5 and E6 includes a transistor T1, T2, T3, T4, T5 and T6 in parallel with the diode D1, D2, D3, D4, D5 and D6.

For example, the first phase P1 corresponds to the potential of a point between the first transistor T1 and the second transistor T2. The first transistor T1 has its collector T1C connected to the potential of 750 V and its transmitter T1E is connected to the collector T2C of the second transistor T2. The transmitter T2E of the second transistor T2 is connected to the ground.

Likewise, the second phase P2 corresponds to the potential of a point between two transistors, the third transistor T3 and the fourth transistor T4. The third transistor T3 has its collector T3C connected to the potential of 750 V and its transmitter T3E is connected to the collector T4C of the fourth transistor T4. The transmitter T4E of the fourth transistor T4 is connected to the ground.

Likewise, the third phase P3 corresponds to the potential of a point between two transistors, the fifth transistor T5 and the sixth transistor T6. The fifth transistor T5 has its collector T5C connected to the potential of 750 V and its transmitter T5E is connected to the collector T6C of the sixth transistor T6. The transmitter T6E of the sixth transistor T6 is connected to the ground.

According to the example of FIG. 2, each of the transistors T1, T2, T3, T4, T5 and T6 is an IGBT transistor supporting 1700 V. An insulated gate bipolar transistor (IGBT) is a semiconductor device from the family of transistors used as electronic switches, primarily in electronic power assemblies. A component supporting 1700 V is typically a specific component, specially dedicated to the railroad field.

The inverter 302 further includes an input capacitance 308.

The input capacitance 308 is positioned in parallel with each of the lines making it possible to generate the three phases P1, P2 and P3.

The filtering device 304 is able to filter each of the three phases P1, P2 and P3.

The filtering device 304 being a filtering device 304 for a three-phase voltage, the filtering device 304 includes three inputs 304E1, 304E2 and 304E3, for the three phases P1, P2, P3 of the inverter 302 and three corresponding outputs 304S1, 304S2 and 304S3, each being connected to the transformer 306.

Each of the phases P1, P2 and P3 is filtered by a filter of the same nature in the filtering device 304 of FIG. 2.

Preferably, the filter applied to each phase is identical.

According to the example of FIG. 2, each filter of the filtering device 304 is an LC circuit.

An LC circuit is an electric circuit comprising at least one dipole generating an inductive impedance and at least one dipole generating a capacitive impedance.

As an example, the dipole generating the inductive impedance is a coil. A coil, solenoid, self-inductance or sometimes self, is a common component in electrical engineering and electronics. A coil is made up of a winding of conductive wire optionally around a core made from a ferromagnetic material that can be an assembly of metal sheets or a ferrite (ferromagnetic ceramic) block. French physicists and engineers often call it an "inductance" by synecdoche, this term designating the characteristic property of the coil, which is its opposition to the variation of the current in its turns.

Below, for simplicity, the term "inductance" is used to refer to a dipole generating an inductive impedance.

Consequently, in the illustrated case, the filtering device 304 includes three inductances L1, L2 and L3 and three capacitors C1, C2 and C3.

Each component of the filtering device 304 includes two terminals.

Thus, the first inductance L1 includes two terminals, a first terminal L1B1 and a second terminal L1B2. The second inductance L2 includes two terminals, a first terminal L2B1 and a second terminal L2B2. The third inductance L3 includes two terminals, a first terminal L3B1 and a second terminal L3B2. The first capacitor C1 includes two terminals, a first terminal C1B1 and a second terminal C1B2. The second capacitor C2 includes two terminals, a first terminal C2B1 and a second terminal C2B2. The third capacitor C3 includes two terminals, a first terminal C3B1 and a second terminal C3B2.

The first terminal L1B1 of the first inductance L1 is connected to the first terminal C3B1 of the third capacitor C3. The second terminal L1B2 of the first inductance L1 is connected to the first input 304E1 of the filtering device 304 corresponding to the first phase P1.

The first terminal L2B1 of the second inductance L2 is connected to the second terminal C1B2 of the first capacitor C1 and to the first terminal C2B1 of the second capacitor C2. The second terminal L2B2 of the second inductance L2 is connected to the second input 304E2 of the filtering device 304 corresponding to the second phase P2.

The first terminal L3B1 of the third inductance L3 is connected to the second terminal C3B2 of the third capacitor C3. The second terminal L3B2 of the third inductance L3 is connected to the third input 304E3 of the filtering device 304 corresponding to the third phase P3.

The first capacitor C1 is inserted between the first output 304S1 of the filtering device 304 corresponding to the first phase P1 and the second output 304S2 of the filtering device 304 corresponding to the second phase P2. This means that the first terminal C1B1 of the first capacitor C1 is connected to the first output 304S1 of the filtering device 304, while the second terminal C1B2 of the first capacitor C1 is connected to the second output 304S2 of the filtering device 304.

The second capacitor C2 is inserted between the second output 304S2 of the filtering device 304 corresponding to the second phase P2 and the third output 304S3 of the filtering device 304 corresponding to the third phase P3. This means that the first terminal C2B1 of the second capacitor C2 is connected to the second output 304S2 of the filtering device

304, while the second terminal C2B2 of the second capacitor C2 is connected to the third output 304S3.

In the example of FIG. 2, the first terminal C2B1 of the second capacitor C2 is connected to the second terminal C1B2 of the first capacitor C1.

The third capacitor C3 is inserted between the first output 304S1 of the filtering device 304 corresponding to the first phase P1 and the third output 304S3 of the filtering device 304 corresponding to the third phase P3. This means that the first terminal C3B1 of the third capacitor C3 is connected to the first output 304S1 of the filtering device 304, while the second terminal C3B2 of the third capacitor C3 is connected to the third output 304S3 of the filtering device 304.

Thus, in the example of FIG. 2, the first terminal C1B1 of the first capacitor C1 is connected to the first terminal C3B1 of the third capacitor C3. Furthermore, the second terminal C2B2 of the second capacitor C3 is connected to the second terminal C3B2 of the third capacitor C3.

The transformer 306 is connected on the one hand to the outputs of the filtering device 304 and on the other hand to the electricity distribution grid 20.

An electric transformer (sometimes abbreviated as transfo) is an electric machine making it possible to modify the current voltage and intensity values delivered by an AC electricity source into a voltage and current system with different values, but with the same frequency and the same form. They perform this conversion with an excellent output.

According to the example of FIG. 2, the transformer 306 includes a primary winding 310 and a secondary winding 312, the secondary winding 312 being able to deliver a signal on its output 312S with a voltage different from the voltage of the signal injected on the inputs 310E1, 310E2 and 310E3 of the primary winding 310.

In the case at hand, the transformer 306 is able to generate an output signal whose voltage reaches 15 kV when the voltage of the injected signal reaches 457 V.

The operation of the device of FIG. 2 will now be described.

In general, the electric converter 30 is able to transfer electricity from the feeder line 6 to the electricity distribution grid 20 to recuperate the braking energy of rail vehicles.

More specifically, the converter 30 is able to rectify the three-phase voltage delivered by the distribution grid 20 into a DC voltage and to deliver the DC voltage to the feeder line 6.

The converter 30 is also able to convert the DC voltage from the feeder line 6 to deliver, on the distribution grid 20, a three-phase voltage built from the DC voltage of the feeder line.

In other words, the converter 30 is able to invert the DC voltage present on the feeder line 6 to deliver, on the distribution grid 20, a three-phase voltage built from this DC voltage.

The substation equipped with such a converter 30 has the advantage that the rectifying and inverting function of the converter 30 is performed with a single inverter 302.

The LC circuit found after the high-voltage transformer 306 associated with an appropriate control of the power inverter 302 provides filtering of the voltage rejected on the three-phase distribution grid 20.

The control of the inverter 302 also makes it possible to guarantee a factor in unit $\cos(\varphi)$ seen by the transformer 306 whether the assembly is in traction or braking. The encroachment phenomenon, i.e., deterioration of the value of the factor in $\cos(\varphi)$ as a function of the load, is thus avoided.

Furthermore, the inverter 302 inspects the power transit from the feeder line 6 to the distribution grid 30.

Moreover, the choice of the switching angles as well as the values of the dispersion inductances of the transformer 306 and the three-phase capacitances make it possible to achieve a fairly high and very high-performing filtering level.

Although the overall output of the converter is lower than in the state of the art, due to the better quality of the produced electric signal, considering the overall system, the output is better.

Thus, the proposed converter 30 makes it possible to ensure the reversibility of the electric flow, a regulation of the DC voltage and active filtering of the voltage of the three-phase grid.

As a result, the substation ensures good efficiency of the electric grid with low pollution.

FIG. 3 illustrates a converter 30 according to another embodiment. Elements identical to the embodiment of FIG. 1 are not described again. Only the differences are highlighted.

From an electrical perspective, the diagram is typically the same as the converter 30 of FIG. 2.

The transformer 306 has two primary windings 314 and 316 and one secondary winding 318.

Each inductance L1, L2, L3 is connected to the three three-phase connectors of each winding 314, 316, 318.

More specifically, for the first phase P1, the first inductance L1 is connected to the first output 318S1 of the secondary winding 318 and the first output 306S1 of the transformer 306, the second inductance L2 is connected to the first output 314S1 of the first primary winding 314 and the first output 306S1 of the transformer 306, and the third inductance L3 is connected to the first output 316S1 of the first primary winding 316 and the second terminal C2B2 of the second capacitor C2. A similar description can be done for the second phase P2 and the third phase P3.

In one embodiment of FIG. 3, the inductances L1, L2 and L3 are integrated into the transformer 306.

The operation of the converter 30 according to the embodiment of FIG. 3 is identical to the operation of the converter 30 according to the embodiment of FIG. 2. The operation is therefore not described again, the same remarks applying.

The converter 30 according to the embodiment of FIG. 3 has the same advantages as the converter 30 according to the embodiment of FIG. 1.

Furthermore, in the embodiment of FIG. 3, it appears that the three inductances L1, L2 and L3 have been integrated into the transformer 306.

This makes it possible to cool the inductances L1, L2 and L3 in the transformer 306 with the same cooling circuit. The cooling circuit specific to the inductances L1, L2 and L3 is therefore eliminated.

Furthermore, the housing of the transformer 306 also includes the inductances L1, L2 and L3, which makes it possible to avoid using an inductance tub.

By filtering device, it is meant the association of at least two physical components, like an inductance and a resistance, the components being linked one to another. An element having a parasitic electrical value like a wire cannot be assimilated as a component in this context.

The invention claimed is:

1. An electric converter for a substation for feeding an electric grid and/or recuperating braking energy from rail vehicles traveling on a railroad track, the substation being connected to a feeder line able to supply a DC voltage to the rail vehicles traveling on the railroad track, the substation comprising an electricity distribution grid able to deliver a corresponding three-phase voltage with three phases, the converter comprising:
  a transformer able to inspect the value of the three-phase voltage delivered by the electricity distribution grid,
  a filtering device able to filter each of the three-phase voltage from the transformer, the filtering device including three inputs for the three phases of the inverter and three corresponding outputs, the transformer being connected on one side to the outputs of the filtering device and on the other side to the distribution grid, the filtering device being a filter reducing the current harmonics that may be reinjected on the electricity distribution grid, the filtering device being an LC circuit, and
  an inverter connected to the filtering device,
  wherein the transformer includes each of the dipoles able to generate an inductance of the filtering device and wherein the electric converter further comprises a cooling circuit, the inductances and the transformer being cooled with the same cooling circuit.

2. The converter according to claim 1, wherein for each generated phase, the inverter includes, in series, two assemblies, each assembly including a diode and a transistor in parallel.

3. The converter according to claim 2, wherein each transistor is an insulated gate bipolar transistor.

4. A substation for feeding a grid and/or recuperating braking energy from rail vehicles traveling on a railroad track, the substation being connected to a feeder line able to supply a DC voltage to the rail vehicles traveling on the railroad track, the substation comprising:
  an electricity distribution grid able to deliver a corresponding three-phase voltage with three phases,
  a single converter according to claim 1.

5. A system for feeding an electric grid and/or for recuperating braking energy from rail vehicles, the system including a plurality of substations according to claim 4.

6. A system for feeding an electric grid and/or for recuperating the braking energy from rail vehicles according to claim 5:
  the plurality of substations being spaced apart from one another by a distance greater than 100 meters, each substation is electrically connected to the feeder line at a connecting point and equipped with:
  a sensor or an estimator of a voltage $U_{ssk}$ at the connecting point,
  a control module of the converter able to automatically switch the converter into a regeneration mode in which the converter continuously transfers electricity from the feeder line to the electricity distribution grid to recuperate the braking energy from the rail vehicles, once the measured or estimated voltage $U_{ssk}$ is above a threshold $U_{C3k}$, such that each substation is associated with a respective braking energy recuperation zone $Z_{fk}$ in which, irrespective of the position of the rail vehicle within that zone $Z_{fk}$, the substation $S_k$ is capable of recuperating at least part of the braking energy of that rail vehicle,
  a braking energy recuperation zone $Z_{fk}$ being a segment $[L_{Gfk}; L_{Dfk}]$ of the feeder line centered around the point $P_k$ and the boundaries $L_{Gfk}, L_{Dfk}$ of which are spaced apart on either side of the point $P_k$ by a distance $F_k$ equal to $(U_{Cmax}-U_{C3mink})/(\rho I_{max})$, where:
  $U_{Cmax}$ is a maximum nonpermanent allowable voltage on the feeder line,
  $U_{C3mink}$ is the minimum value that can be assumed by the threshold $U_{c3k}$ during the operation of the substation,
  $\rho$ is the linear resistance of the feeder line, and
  $I_{max}$ is the maximum allowable intensity for the current circulating on the feeder line, the value of the limit $U_{C3mink}$ is such that the distance $F_k$ is greater than or equal to $D_k/2$.

7. The system according to claim 6, wherein the substations are equidistant from one another.

8. The system according to claim 5, wherein the substations are equidistant from one another.

9. The converter according to claim 1, wherein the filtering device includes three inductances and three capacitors.

10. The converter according to claim 9, wherein a first terminal of the second capacitor is connected to a second terminal of the first capacitor, a first terminal of the first capacitor being connected to a first terminal of the third capacitor, a second terminal of the second capacitor being connected to a second terminal of the third capacitor.

11. The converter according to claim 9, wherein a first terminal of the first inductance is connected to a first terminal of the third capacitor, a second terminal of the first inductance being connected to the first input of the filtering device corresponding to the first phase;
  a first terminal of the second inductance being connected to a second terminal of the first capacitor and to a first terminal of the second capacitor, a second terminal of the second inductance being connected to the second input of the filtering device corresponding to the second phase,
  a first terminal of the third inductance being connected to a second terminal of the third capacitor, a second terminal of the third inductance being connected to the third input of the filtering device corresponding to the third phase.

12. The converter according to claim 11, wherein the first terminal of the first capacitor is connected to the first output of the filtering device, while the second terminal of the first capacitor is connected to the second output of the filtering device;
  the first terminal of the second capacitor being connected to the second output of the filtering device, the second terminal of the second capacitor being connected to the third output;
  the first terminal of the third capacitor being connected to the first output of the filtering device, the second terminal of the third capacitor being connected to the third output of the filtering device.

13. The converter according to claim 9, wherein the transformer has two primary windings and one secondary winding, each inductance being connected to the three three-phase connectors of each winding.

14. The converter according to claim 13, wherein the filtering device includes nine inductances and three capacitors;
  for the first phase, the first inductance being connected to a first output of the secondary winding and the first output of the transformer, the second inductance being connected to the first output of the first primary winding and the first input of the transformer, the third inductance being connected to the first output of the first primary winding and a second terminal of the second capacitor;
  for the second phase, the fourth inductance being connected to a second output of the secondary winding and a second output of the transformer, the fifth inductance being connected to a second output of the first primary winding and a second input of the transformer, the sixth inductance being connected to a second output of the first primary winding and a second terminal of the first capacitor;

for the third phase, the seventh inductance being connected to a third output of the secondary winding and a third output of the transformer, the eighth inductance being connected to a third output of the first primary winding and a third input of the transformer, the ninth inductance being connected to a third output of the first primary winding and a first terminal of the third capacitor.

\* \* \* \* \*